United States Patent [19]

Becker

[11] 4,170,443

[45] Oct. 9, 1979

[54] APPARATUS FOR FORMING SPRINKLER HEAD PROTECTOR

[76] Inventor: Conrad R. Becker, 818 Shetland Rd., Las Vegas, Nev. 89107

[21] Appl. No.: 935,456

[22] Filed: Aug. 21, 1978

[51] Int. Cl.$^2$ .......................... B28B 7/00; B29C 5/00

[52] U.S. Cl. .................................... 425/110; 425/125; 425/127; 425/218; 425/426

[58] Field of Search ............... 425/110, 125, 127, 218, 425/426, 427; 264/271, 267, 333; 239/201, 288.3, 288.5

[56] References Cited

U.S. PATENT DOCUMENTS

| | | | |
|---|---|---|---|
| 1,162,924 | 12/1915 | Horning | 425/215 |
| 3,015,448 | 1/1962 | Hurless | 239/228.5 |
| 3,662,956 | 5/1972 | Hedman | 239/288.5 |
| 3,904,120 | 9/1975 | Sbicca | 239/288.5 |

FOREIGN PATENT DOCUMENTS

| | | | |
|---|---|---|---|
| 232122 | 6/1959 | Australia | 425/427 |

*Primary Examiner*—W. E. Hoag
*Attorney, Agent, or Firm*—Seiler & Quirk

[57] ABSTRACT

Apparatus for forming a concrete shield around a sprinkler head is a frusto-conical shaped form having a removable concentric flexible sleeve therein. A rotatable trowel is positioned inside the form to smooth the upper concrete surface. An inverted cup adapted to fit over the head of the sprinkler during the concrete forming process prevents wet concrete from contacting the top of the sprinkler head.

9 Claims, 4 Drawing Figures

APPARATUS FOR FORMING SPRINKLER HEAD PROTECTOR

BACKGROUND OF THE INVENTION

This invention relates to a method and apparatus for forming concrete protectors for lawn sprinkler heads. More particularly it relates to a slightly cone-shaped form having a rotating trowel and having an inverted cup to prevent the sprinkler head from becoming coated with concrete.

Many different kinds of devices have been known for use in enclosing lawn sprinkler heads to prevent damage caused by accidental contact of the sprinkler head with lawn mowers, feet, or other instrumentalities. In addition, with the normal method of installation of sprinkler heads at or slightly below ground level, grass blades adjacent the sprinkler head frequently will grow into the head, obstructing the water spray or preventing proper function of a pop-up water distributor. Accordingly, frequent repair or replacement of sprinkler heads and connecting plastic pipe is common.

A variety of devices have been proposed to solve this problem. For example, a thick plastic disc adapted to be recessed about a sprinkler head to stabilize the head and prevent grass from growing into the sprinkler head is described in Sbicca, U.S. Pat. No. 3,904,120. These premolded, polyurethane discs fit only around the sprinkler head and not around the subsurface piping, and rely on the subsurface soil for stability. Another protection system is disclosed in Merryweather, U.S. Pat. No. 3,703,992. This device comprises a shield having a series of vertically stacked ring members which build up around the vertical pipes supporting the sprinkler head. An upper member formed to fit around the sprinkler head rests on the stack of vertical rings. This device must be preformed to fit each variety and size of sprinkler head and pipe. Another example of a concrete head protector is shown in Hedman, U.S. Pat. No. 3,662,956. The Hedman device is a preformed concrete sleeve into which the sprinkler head is inserted upon installation of the system.

Little attention has been given to forming concrete shields in places around sprinkler heads after the system has been installed. Attempts to pour concrete in place around sprinkler heads have been crude, generally resulting in an uneven upper surface, and frequently contaminating the sprinkler head with bits of concrete, thereby preventing its proper operation. Although concrete molding devices for other purposes have been known, as for example in Horning, U.S. Pat. No. 1,162,924, no device is known specifically designed to mold concrete sprinkler head protectors in place in the soil.

Accordingly, it is an object of the invention to provide a device for quickly and easily molding a concrete sprinkler head protector in the ground. It is another object of the invention to provide apparatus which forms concrete around the sprinkler head to provide support therefor without permitting wet concrete to contact the top of the sprinkler head. These and other objects of the invention will be apparent from the following detailed description of a specific embodiment of the invention.

SUMMARY OF THE INVENTION

Apparatus for forming a concrete shield around a lawn sprinkler head comprises an enclosed housing having an aperture in the roof for receiving wet concrete, a rotatable trowel having a substantially horizontal blade, means for rotating the trowel, and cover means to protect the working portion of the sprinkler head from contacting the wet concrete.

BRIEF DESCRIPTION OF THE DRAWINGS

The invention is best understood with reference to the drawings in which.

DETAILED DESCRIPTION OF THE INVENTION

Figure 1:
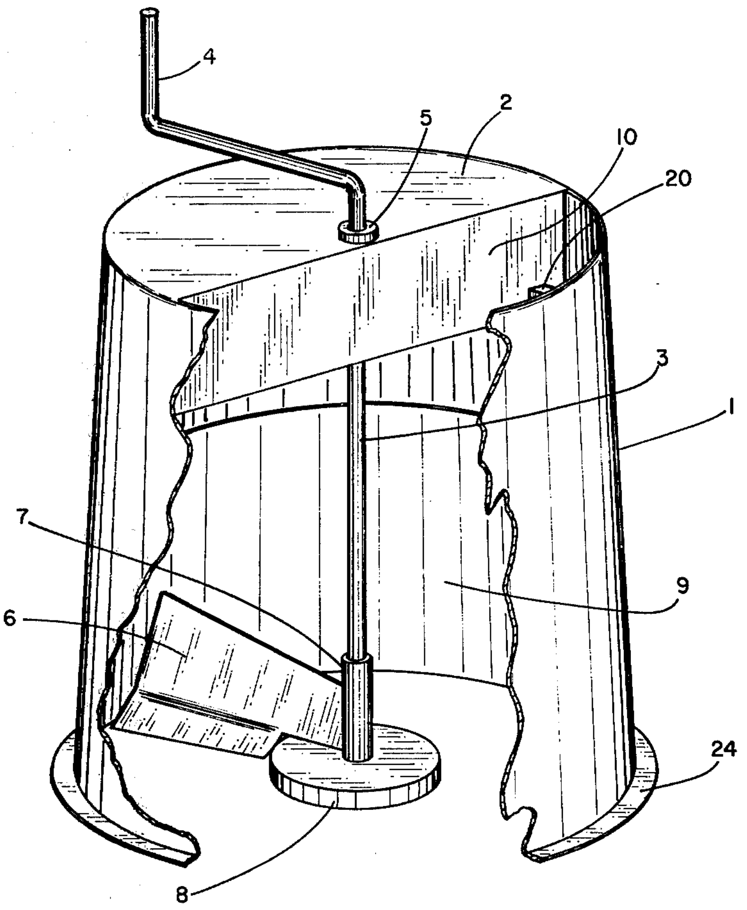
FIG. 1 is a cutaway perspective view of the apparatus of the invention.

Referring to FIG. 1, the sprinkler head mold forming device comprises an inverted, frusto-conical shaped member 1 having a roof portion 2 which covers approximately a half of the upper opening. The remainder of the upper portion has an opening 10 leading into the interior of the device. A vertical shaft 3 extends through the roof and is supported by collar 5, terminating in handle 4. At the lower end of the shaft, a rotating trowel blade 6 extends radially from the shaft, being attached to the shaft with sleeve 7. The trowel blade has a straight horizontal lower edge which rotates in a horizontal plane to smooth the wet concrete surface. The trowel is welded to the sleeve, which is in turn attached to the shaft by means of a set screw (not shown).

Sprinkler head protector cup 8 is mounted at the bottom of the shaft to cover the operating portion of the sprinkler head, and is freely rotatable independently of the shaft. As shown, the protector is in the shape of an inverted cylindrical cup, but can take any shape depending on the shape of the sprinkler head. As the handle 4 is turned, the trowel blade rotates with the shaft, but the protector cup 8 remains in place over the head. The shaft slides freely upwardly and downwardly through the roof, having full motion between support collar 5 and the upper edge of sleeve 7.

Figure 2:
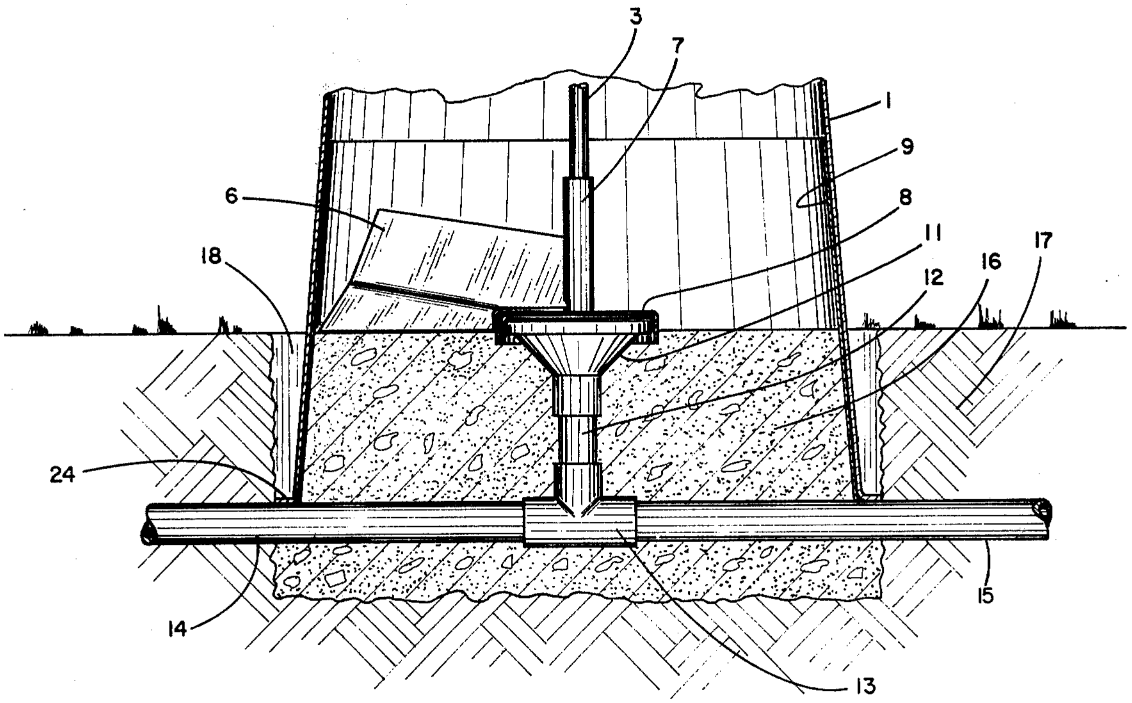
FIG. 2 is an elevational sectional view of the apparatus in place over a sprinkler head.

The apparatus is shown in place over a sprinkler head in FIG. 2. As shown in the Figure, sprinkler head 11, attached by vertical pipe support 12, is attached through tee 13 to main sprinkler plastic pipe sections 14 and 15. A hole 18 has been dug in the ground 17, and concrete 16 has been poured through opening 10 in the top of the forming device around the sprinkler head and pipe. Protective cup 8 rests over the top of sprinkler head 11, thereby preventing any concrete from entering or contacting sprinkler head during the forming process. The trowel 6 rests on the upper surface of the concrete and smooths the surface as the handle 4 is rotated.

A very important part of the invention is a concrete forming sleeve 9, which fits inside the forming device and extends from the bottom thereof to a level several inches above the top of the concrete protector. This sleeve is preferably fabricated from a heavy paper material of sufficient strength to hold the wet concrete in place after the forming device has been removed. The walls of the forming device and the paper form sleeve are both slightly conical in shape, tapering upwardly to permit easy removal of the forming device from the sleeve after the concrete has been poured, leaving the sleeve in place in the ground until the concrete hardens. A lug 20 acts as a stop to keep the sleeve properly oriented in the device.

Figure 4:
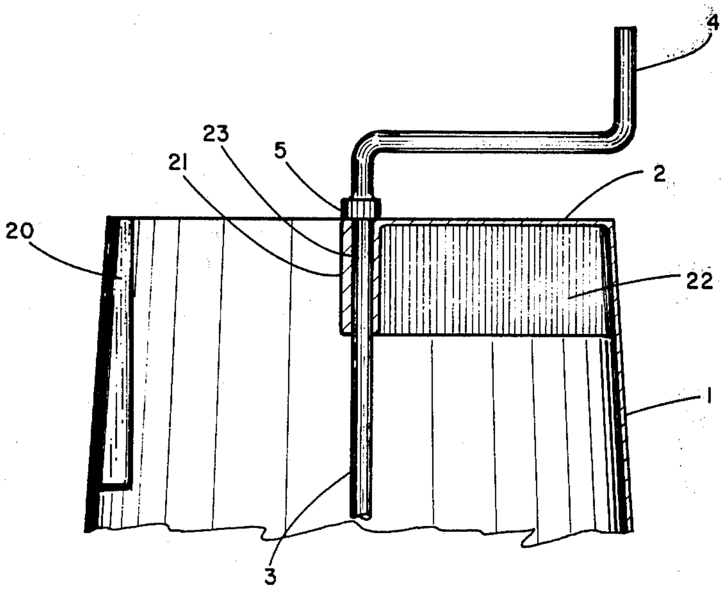
FIG. 4 is a partial sectional view of the upper portion of the apparatus showing the support for the rotating handle.

The upper portion of the concrete forming device is shown in FIG. 4. The roof 2 and handle 4 are supported by two substantially perpendicular brace members 21 (shown in cross section) and 22. A bore 23 in the cross braces at the point of their juncture receives shaft 3, which is centrally located in the device. The shaft is freely rotatable in the bore.

The handle 4 serves only as a means for rotating the trowel, and can be motor driven. In another embodiment of the invention, the shaft 3 extends through the roof and terminates in a bit which engages the chuck of a variable speed power tool. In this manner, the trowel can be engaged and driven quickly without significant exertion.

Use of the forming device of the invention is quite simple. First, a hole slightly in excess of the bottom diameter of the device is dug around the sprinkler head. This hole can be dug to a depth either just above or just below the supporting main sprinkler lines. Next, the forming device with paper sleeve 9 in place is inserted in the hole around the sprinkler head, with protective cup 8 fitting over the top of the head. As the device is lowered into the ground, the protective cup and trowel will elevate relative to the bottom of the forming device when the cup contacts the sprinkler head, extending the shaft upwardly through the roof of the device. When the forming device has come to rest in the ground, wet concrete is poured through the opening 10 in the top of the device, filling the hole in the ground. A concentric, horizontal rim 24 extends around the base of the forming device, helping to add strength to maintain the shape of the device when the concrete is poured, and to prevent concrete from flowing up around the device and onto the ground. The rim is optional and may not be needed if the device has sufficient strength and rigidity to hold its shape. When sufficient concrete has been poured into the hole to bring the level up near the sprinkler head, the trowel is rotated by means of handle 4 to smoothe the upper surface of the concrete. More concrete may be added if necessary.

Figure 3:
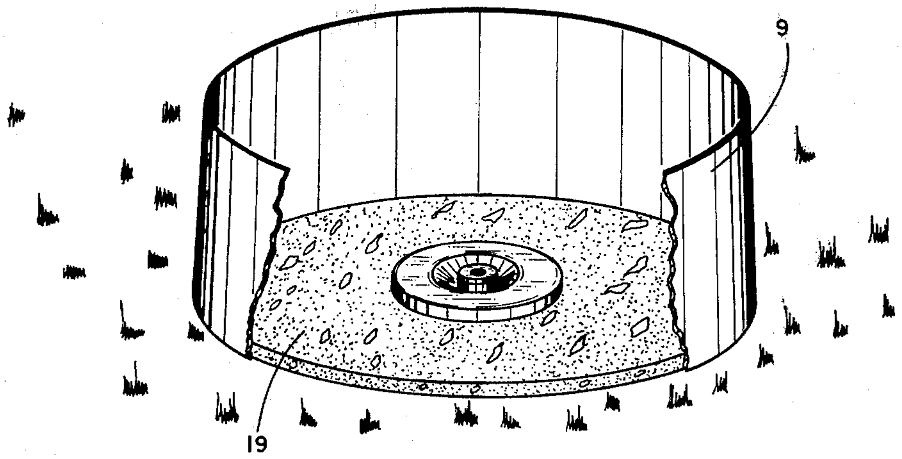
FIG. 3 shows a sprinkler head with the concrete and concrete form in place.

After the smoothing operation is complete, the forming device is lifted upwardly, leaving the paper forming sleeve 9 in place around the wet concrete, as shown in FIG. 3. When the concrete has set, the form 9 may be easily removed by pulling it upwardly, or by tearing or cutting the form down to ground level.

The materials of construction of the forming device of the invention are conventional. The roof and walls of the device can easily be made by conventional plastics forming techniques, such as molding, and the handle, trowel, and protective cup are generally metal, preferably steel.

Many modifications may be made within the spirit and scope of the invention, which should not be considered limited by the detailed description of a specific embodiment herein. Accordingly, the invention should be limited in scope only by the following claims.

I claim:

1. Apparatus for forming a cast concrete protection about an installed lawn sprinkler, comprising: a peripheral housing open at the bottom and having an aperture for receiving wet cement aggregate, said housing having rotably mounted therein a trowel blade having a lower edge which can be rotated in a substantially horizontal plane, a shaft for rotating said blade and a cover means attached to said shaft, said cover means being adapted to cover a sprinkler head and exclude wet cement aggregate therefrom during said forming.

2. The apparatus of claim 1 wherein the housing is rigid, hollow, and substantially cylindrical in shape.

3. The apparatus of claim 1 wherein the turning means comprises a handle.

4. The apparatus of claim 1 wherein said cover means is rotatable separately from said shaft.

5. The apparatus of claim 1 also comprising cover means for protecting the operating portion of the sprinkler head from contacting wet cement during the forming operation.

6. The apparatus of claim 1 wherein the cover means comprises an inverted cylindrical cup.

7. The apparatus of claim 1 wherein the housing is frusto-conical in shape.

8. The apparatus of claim 1 also comprising a removable sleeve inside the housing for retaining the concrete in place after the housing is removed from a sprinkled location.

9. The apparatus of claim 8 wherein the removable sleeve is substantially concentric with the housing, and is located adjacent the interior of the housing.

* * * * *